US010050575B2

(12) United States Patent
Nojima et al.

(10) Patent No.: US 10,050,575 B2
(45) Date of Patent: Aug. 14, 2018

(54) PARTITIONED MOTOR DRIVE APPARATUS FOR SUBSEA APPLICATIONS

(71) Applicants: Eaton Corporation, Cleveland, OH (US); ONESUBSEA IP UK LIMITED, London (GB)

(72) Inventors: Geraldo Nojima, Matthews, NC (US); Audun Magne Askeland, Bergen (NO)

(73) Assignees: Eaton Intelligent Power Limited (IE); One Subsea IP UK Limited (GB)

( * ) Notice: Subject to any disclaimer, the term of this patent is extended or adjusted under 35 U.S.C. 154(b) by 0 days.

(21) Appl. No.: 14/575,032

(22) Filed: Dec. 18, 2014

(65) Prior Publication Data
US 2016/0181964 A1   Jun. 23, 2016

(51) Int. Cl.
*H02P 1/30* (2006.01)
*H02P 27/06* (2006.01)
*F04D 13/08* (2006.01)
*F04D 25/06* (2006.01)

(52) U.S. Cl.
CPC ............ *H02P 27/06* (2013.01); *F04D 13/086* (2013.01); *F04D 25/0686* (2013.01)

(58) Field of Classification Search
CPC ..................................................... H02P 27/04
USPC ................................................ 318/503, 494
See application file for complete search history.

(56) References Cited

U.S. PATENT DOCUMENTS

| 4,138,669 | A   |   | 2/1979  | Edison |              |
|-----------|-----|---|---------|--------|--------------|
| 4,750,150 | A   | * | 6/1988  | Weppler | G05B 19/054 |
|           |     |   |         |         | 710/8       |
| 5,166,677 | A   |   | 11/1992 | Schoenberg |          |
| 5,193,985 | A   | * | 3/1993  | Escue  | E21B 43/128  |
|           |     |   |         |        | 166/66       |
| 6,045,333 | A   | * | 4/2000  | Breit  | F04B 47/06   |
|           |     |   |         |        | 417/42       |
| 6,335,870 | B1  | * | 1/2002  | Sakurai | H02M 5/44   |
|           |     |   |         |        | 363/34       |

(Continued)

FOREIGN PATENT DOCUMENTS

WO   WO 2004/016904 A1   2/2004
WO   WO 2008/055515 A1   5/2008

OTHER PUBLICATIONS

International Search Report and Written Opinion Corresponding to International Application No. PCT/US2015/063865; Date of Mailing: Apr. 15, 2016; 12 Pages.

(Continued)

*Primary Examiner* — David S Luo
(74) *Attorney, Agent, or Firm* — Ward and Smith, P.A.

(57) ABSTRACT

A system includes an above-surface control unit and a subsea motor drive unit. The above-surface control unit includes a variable speed motor control circuit configured to generate at least one switch control signal and a first communications circuit configured to transmit the at least one switch control signal over a communications medium. The subsea motor drive unit includes a driver circuit configured to be coupled to an electric motor and comprising at least one semiconductor switch and a second communications circuit coupled to the first communications circuit via the communications medium and configured to recover the transmitted at least one switch control signal and to apply the recovered at least one switch control signal to the driver circuit.

26 Claims, 4 Drawing Sheets

(56) References Cited

U.S. PATENT DOCUMENTS

| | | | | |
|---|---|---|---|---|
| 6,414,455 B1 * | 7/2002 | Watson | ............... | F04B 47/02 318/432 |
| 6,595,487 B2 | 7/2003 | Johansen | | |
| 6,867,364 B2 | 3/2005 | Hafskjold et al. | | |
| 7,202,619 B1 * | 4/2007 | Fisher | ............... | F04D 15/0066 318/400.29 |
| 7,330,779 B2 * | 2/2008 | Schulz | ............... | E21B 41/0021 417/44.11 |
| 8,334,666 B2 * | 12/2012 | Plitt | ............... | H02P 3/00 318/255 |
| 8,400,093 B2 * | 3/2013 | Knox | ............... | H02P 3/00 318/255 |
| 8,439,080 B2 | 5/2013 | Uusipaikka | | |
| 8,456,116 B2 * | 6/2013 | Burdick | ............... | H02P 27/06 318/400.29 |
| 8,549,924 B2 | 10/2013 | Virtanen et al. | | |
| 8,698,446 B2 * | 4/2014 | Venkataraman | ....... | H02P 6/182 318/400.14 |
| 9,056,663 B2 | 6/2015 | Bo | | |
| 2009/0101338 A1 | 4/2009 | Flanders | | |
| 2011/0050144 A1 | 3/2011 | Knox et al. | | |
| 2012/0001482 A1 * | 1/2012 | Burdick | ............... | E21B 33/035 307/9.1 |
| 2014/0147243 A1 | 5/2014 | Torkildsen et al. | | |
| 2016/0181964 A1 | 6/2016 | Nojima | | |
| 2016/0248364 A1 | 8/2016 | Askeland | | |

OTHER PUBLICATIONS

VanderMeulen et al. "Current source inverter vs. Voltage source inverter topology", White Paper WP020001EN, Eaton, Jun. 2014, 8 pages.

The Magazine of the Society for Underwater Technology, Society of Underwater Technology, Subsea Power Distribution Underwater Vehicles Sonar, UT3, Aug./Sep. 2013, 68 pages.

Notification Concerning Transmittal of International Preliminary Report on Patentability, International Application No. PCT/US2015/063865; dated Jun. 20, 2017, 9 Pages.

* cited by examiner

PARTITIONED MOTOR DRIVE APPARATUS FOR SUBSEA APPLICATIONS

BACKGROUND

The inventive subject matter relates to motor drive apparatus and, more particularly, to motor drive apparatus for subsea applications, such as offshore oil and gas exploration.

Motor drives are used in a number of different industrial applications. Variable speed AC motor drives, such as variable frequency drives (VFDs), are used, for example, for compressors, pumps, and the like. A common use of VFDs is to control compressor and pump motors in oil and gas exploration and production operations.

A VFD may control the speed and/or torque of an AC motor by varying the frequency and amplitude of the voltage applied to the motor. A VFD may be used to operate a motor at an optimal speed for a given load and/or to provide a gradual startup and/or slowdown that limits current and protects mechanical components, such as gear trains, pipelines, and the like, from mechanical shock.

A typical VFD may include an inverter that is coupled to a DC power source, which may be a DC power distribution system or DC power derived from an AC power distribution system using a rectifier. The inverter may include semiconductor switches (e.g., transistors, silicon controlled rectifiers and the like) that are controlled by a digital control circuitry including a microcontroller or other data processing device. In particular, the microcontroller may receive feedback signals (e.g., speed, voltage, current and the like) and may responsively generate drive signals that are used to control power transistors or other semiconductor switching devices that are used to drive the motor.

In conventional offshore oil and gas applications, VFDs typically are used to drive motors located on above-surface exploration and production platforms. In recent years, however, oil and gas processing equipment has increasingly moved from such platforms to the seabed. Such subsea processing equipment may be deployed thousands of feet below the surface and may be subjected to intense pressures and/or temperatures that can degrade reliability. They may also be distributed over a wide area. It may be time-consuming and expensive to maintain and replace equipment in this environment due to the depths and distances involved.

SUMMARY

Some embodiments of the inventive subject matter provide a system including an above-surface control unit and a subsea motor drive unit. The above-surface control unit includes a variable speed motor control circuit configured to generate at least one switch control signal and a first communications circuit configured to transmit the at least one switch control signal over a communications medium. The subsea motor drive unit includes a driver circuit configured to be coupled to an electric motor and including at least one semiconductor switch. The subsea motor drive unit further includes a second communications circuit coupled to the first communications circuit via the communications medium and configured to recover the transmitted at least one switch control signal and to apply the recovered at least one switch control signal to the driver circuit.

In some embodiments, the first and second communications circuits may be serial communications circuits. The first communications circuit may be configured to multiplex a plurality of switch control signals and the second communications circuit is configured to demultiplex the multiplexed plurality of switch control signals.

In some embodiments, the second communications circuit may be configured to transmit at least one sensor signal over the communications medium, the first communications circuit may be configured to receive the transmitted at least one sensor signal and the variable speed motor control circuit may be configured to generate the at least one switch control signal responsive to the received at least one sensor signal.

In some embodiments, the subsea motor drive unit and the above-surface control unit may be configured to receive electric power from a separate power sources.

In some embodiments, the communications medium may include a fiber optic cable.

In some embodiments, the variable speed motor control circuit may include a first variable speed motor control circuit and the system may further include a subsea second variable speed motor control circuit configured to control the subsea motor drive unit.

Further embodiments provide an apparatus including a submersible driver circuit configured to be coupled to an electric motor and including at least one semiconductor switch and a submersible communications circuit coupled to the submersible driver circuit and configured to be coupled to an control unit via a communications cable, to recover at least one switch control signal transmitted over the communications cable by the control unit and to apply the recovered at least one switch control signal to the submersible driver circuit.

Still further embodiments provide a system including a submerged electric motor and a variable speed motor drive including a submerged motor drive unit coupled to the electric motor and including an inverter circuit including at least one semiconductor switch and a above-surface control unit coupled to the submerged motor drive unit via a fiber optic communications cable, the above-surface control unit transmitting at least one switch control signal for the at least one semiconductor switch to the submerged motor drive unit via the fiber optic communications cable. The system may further include a submerged variable speed motor control unit that controls the submerged motor drive unit.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

The inventive subject matter may be embodied as apparatus, methods and computer program products. Some embodiments may be described with reference to block diagrams and/or operational illustrations that illustrate structures and operations. Blocks of the block diagrams and/or operational illustrations may generally implemented using electric circuits configured to perform the specified functions. These "circuits" may generally be implemented using analog and/or digital circuitry and may include discrete components and/or integrated components, such as data processing integrated circuits (e.g., microprocessors, microcontrollers, digital signal processors and the like) and application-specific integrated circuits (ASICs).

Each block in such diagrams may represent a module, segment, or portion of computer-executable program code for implementing the specified logical function(s). Computer-executable program code may be provided one or more data processors, special purpose processors, ASICs, and/or other programmable data processing apparatus, such that the instructions, which execute to the code to provide the functions/acts specified in the block diagrams and/or operational block or blocks and thus provide circuits that perform such functions/acts.

These computer-executable program code may also be stored in a non-transitory medium that may direct a data processor to function in a particular manner, such that the program code stored in the non-transitory medium constitute an article of manufacture including instructions that implement the functions specified in the block or blocks of the block diagrams and/or operational illustrations. The non-transitory medium may be, but is not limited to, an electronic, magnetic, optical, electromagnetic, or semiconductor system, apparatus, or device. More specific examples (a non-exhaustive list) of the non-transitory medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

Some embodiments of the inventive subject matter arise from a realization that motor drives may be advantageously deployed in marine environments by partitioning the drive into above-surface and subsea units. In some embodiments, driver circuitry, such as semiconductor switches, may be located in a subsea unit and linked to an above-surface control unit using a high-speed communications link, such as a fiber optic link. The above-surface unit may include control circuitry, such as processor circuitry, that may be more vulnerable to harsh conditions, more likely to fail and/or may require frequent user interventions for actions such as software updates. The subsea unit may be generally limited to components that are simpler, more resistant to harsh conditions and less likely to fail, such as power semiconductor circuits and relatively simple logic circuits for driving such power semiconductor circuits. As motors used in subsea applications are commonly relatively lossy, latency introduced by a communications link even 200 km long or longer between a computer-based controller and a power semiconductor driver circuit may not introduce instability in control of the motor. According to further aspects, a system may include subsea control circuitry combined with a redundant above-surface controller that may be used as a backup in the event of failure of the subsea control circuitry.

Figure 1:
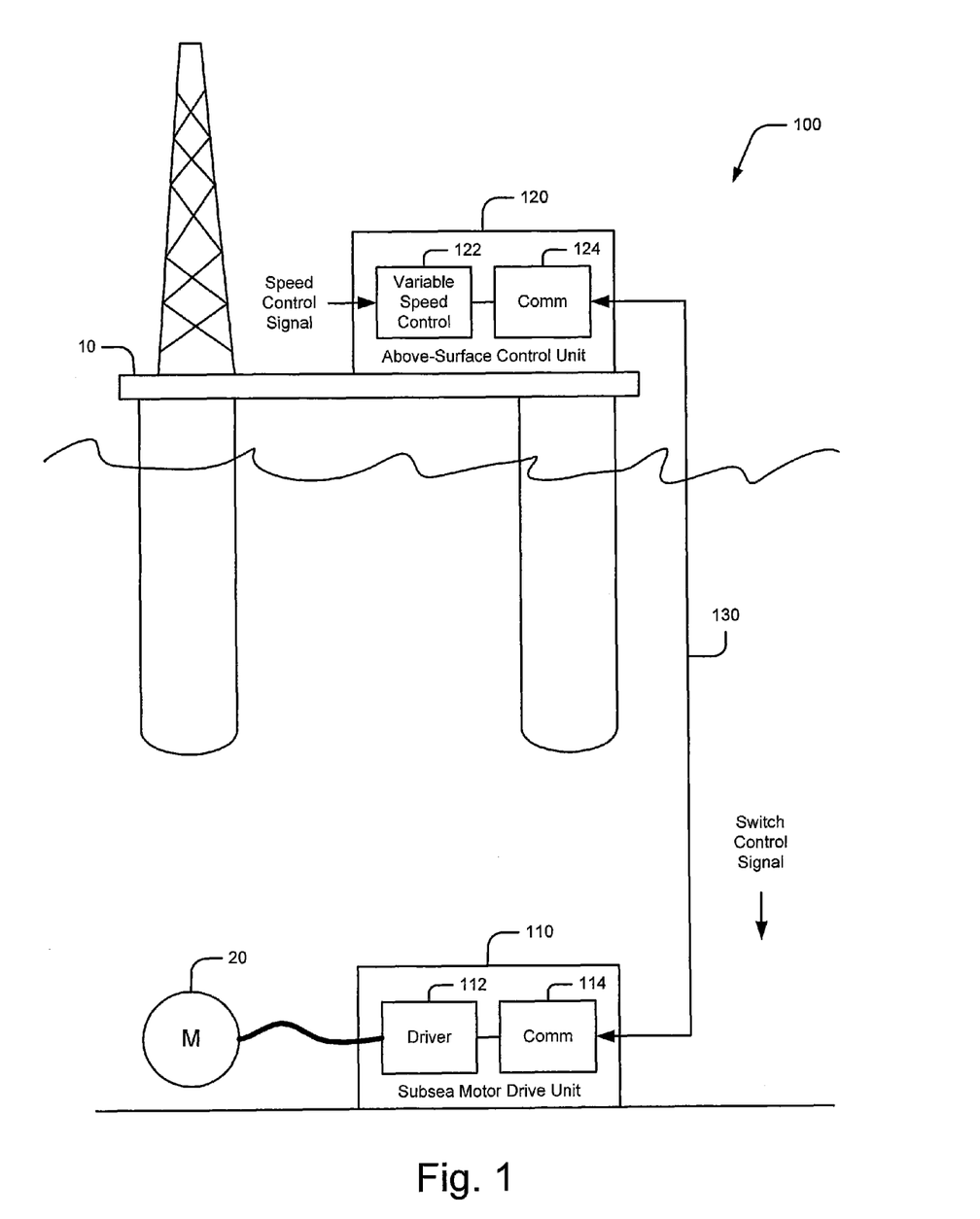
FIG. 1 is a schematic diagram illustrating a variable speed motor drive system according to some embodiments of the inventive subject matter.

FIG. 1 illustrates a system 100 according to some embodiments of the inventive subject matter. The system 100 includes at least one subsea motor drive unit 110 and at least one above-surface control unit 120. The subsea motor drive unit 110 may include one or more submerged assemblies positioned, for example, on the seabed and/or on a seabed-mounted structure or suspended above the sea bed from an above-surface platform or vessel. The subsea motor drive unit 110 includes a driver circuit 112 configured to be coupled to at least one submerged motor 20, e.g., a drilling or pump motor. The driver circuit 112 includes one or more semiconductor switches, for example, one or more power transistors, silicon-controlled rectifiers (SCRs) or other power semiconductor devices. The driver circuit 112 is coupled to a communications circuit 114, which may be configured to receive drive signals for control of the semiconductor switches in the driver circuit 112 from the above-surface control unit 120 via a communications link 130. The communications link 130 may include, for example, a wire or fiber optic cable.

The above-surface control unit 120 may include, for example, one or more assemblies positioned at an above-surface location, such as on an exploration or production platform 10 or at a land-based location kilometers away from the subsea motor drive unit 110. The above-surface control unit 120 includes a communications circuit 114 coupled to the communications circuit 124 of the subsea motor drive unit 110 via the communications link 130. A variable speed control circuit 122 is coupled to the communications circuit 124 and is configured to provide switch control signals that are conveyed by the communications circuit 124 to the subsea motor drive unit 110. The switch control signals may be generated responsive to a speed control signal, e.g., a signal commanding operation of the motor 20 at a particular rotational speed.

It will be understood that the subsea motor drive unit 110 and the above-surface control unit 120 may implement any of a number of different types of variable frequency drive technologies, such as voltage source inverter, current source inverter, step inverter, cycloconverter and slip recovery architectures. The above-surface control unit 120 may implement any of a number of different control techniques, such as V/Hz control, vector control (e.g., space vector pulse width modulation).

Figure 2:
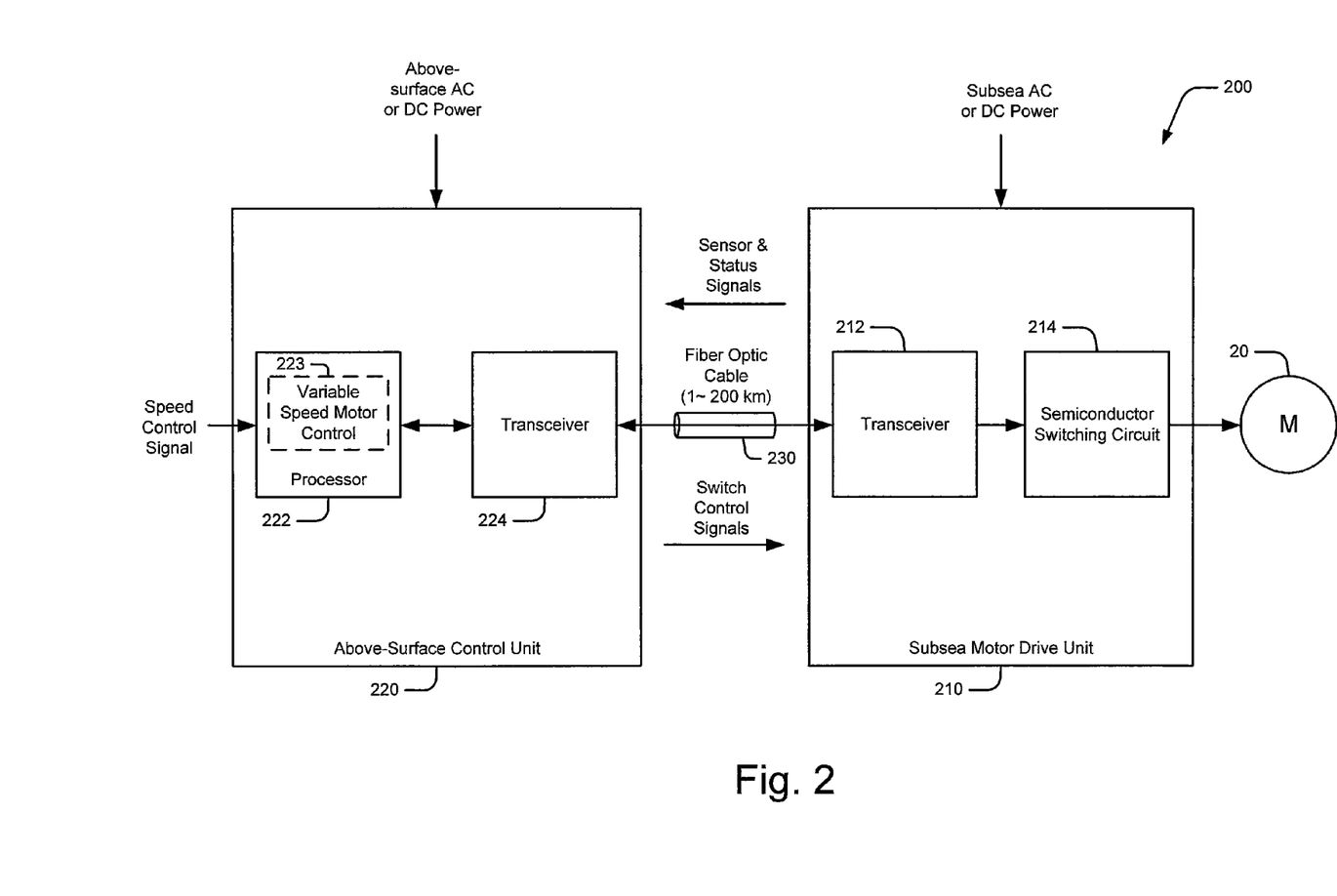
FIG. 2 is a schematic diagram illustrating a variable speed motor drive system with a fiber optic link according to some embodiments of the inventive subject matter.

FIG. 2 illustrates a variable speed motor drive system 200 according to further embodiments of the inventive subject matter. The system 200 includes a subsea motor drive unit 210 and an above-surface control unit 220 linked by a fiber optic cable 230. The subsea motor drive unit 210 includes a semiconductor switching circuit 214 that is configured to be coupled to a motor 20. The semiconductor switching circuit 214 includes one or more semiconductor switches (e.g., transistors, SCRs, GTOs, or the like), which are controlled by switch control signals received from an optical transceiver circuit 212. The semiconductor switching circuit 214 may be coupled to a subsea AC or DC power distribution system to receive power for driving an attached subsea motor. The optical transceiver circuit 212 may be powered from the same source.

The optical transceiver circuit 212 receives switch control signals from the above-surface control unit 220 via the fiber optic cable 230. The switch control signals may be transmitted by the above-surface control unit 220 in, for example, a multiplexed manner over a serial communications link that uses the fiber optic cable 230 as a communications medium. The transceiver circuit 212 may be configured to demultiplex the received signal to recover the switch control signals for application to the semiconductor switches of the semiconductor switching circuit 214.

The above-surface control unit 220 includes a processor circuit 222 (e.g., a microcontroller or other processing device along with associated memory and peripheral circuitry) that is configured to provide a variable speed motor controller 213 using software executing thereon. A transceiver circuit 224 is coupled to the processor 222 and is configured to transmit switch control signals generated by the variable speed motor controller 213 to the subsea motor drive unit 210 via the fiber optic cable 230. The switch control signals may be generated responsive to, for example, an externally-supplied speed control signal and/or to a speed control signal generated by the processor 222, e.g., by another software process. The above-surface control unit 220 may be powered from a different power source than the subsea motor drive unit 210, such as an AC or DC power distribution system of an offshore platform or vessel or a land-based power distribution system.

As further shown, the subsea motor drive unit 210 may also communicate sensor, status and other signals back to the above-surface control unit 220 via the fiber optic cable 230. For example, the subsea motor drive unit 210 may send feedback signals, such as voltage, current, temperature and/or speed sensor feedback signals, to the above-surface control unit 220, and the variable speed controller 213 may generate switch control signals based on such feedback signals. Such signals may also be used to support other functions, such as monitoring, diagnostic and testing functions.

Generally speaking, distribution of motor drive circuitry between the above-surface control unit 220 and the subsea motor drive unit 210 can provide a desirable combination of reliability, availability, performance, safety and other characteristics. Generally, it is desirable to place high-current circuitry, such as the semiconductor switching circuitry 214, in closer proximity to the load being driven to reduce the lengths of high-current capacity cabling and thus reduce costs and losses. Such high-current circuitry may also be more tolerant of the subsea environment and may exhibit a relatively high reliability and require relatively simple maintenance that may be performed by subsea robots or other remotely operated devices, so that limited access to the subsea unit 210 may not be particularly problematic. However, circuitry that may require more frequent and/or complex maintenance and updating and/or that may be more vulnerable to failure, such as data processing circuitry, may be apportioned to the above-surface control unit 220 to ease maintenance and repair.

Figure 3:
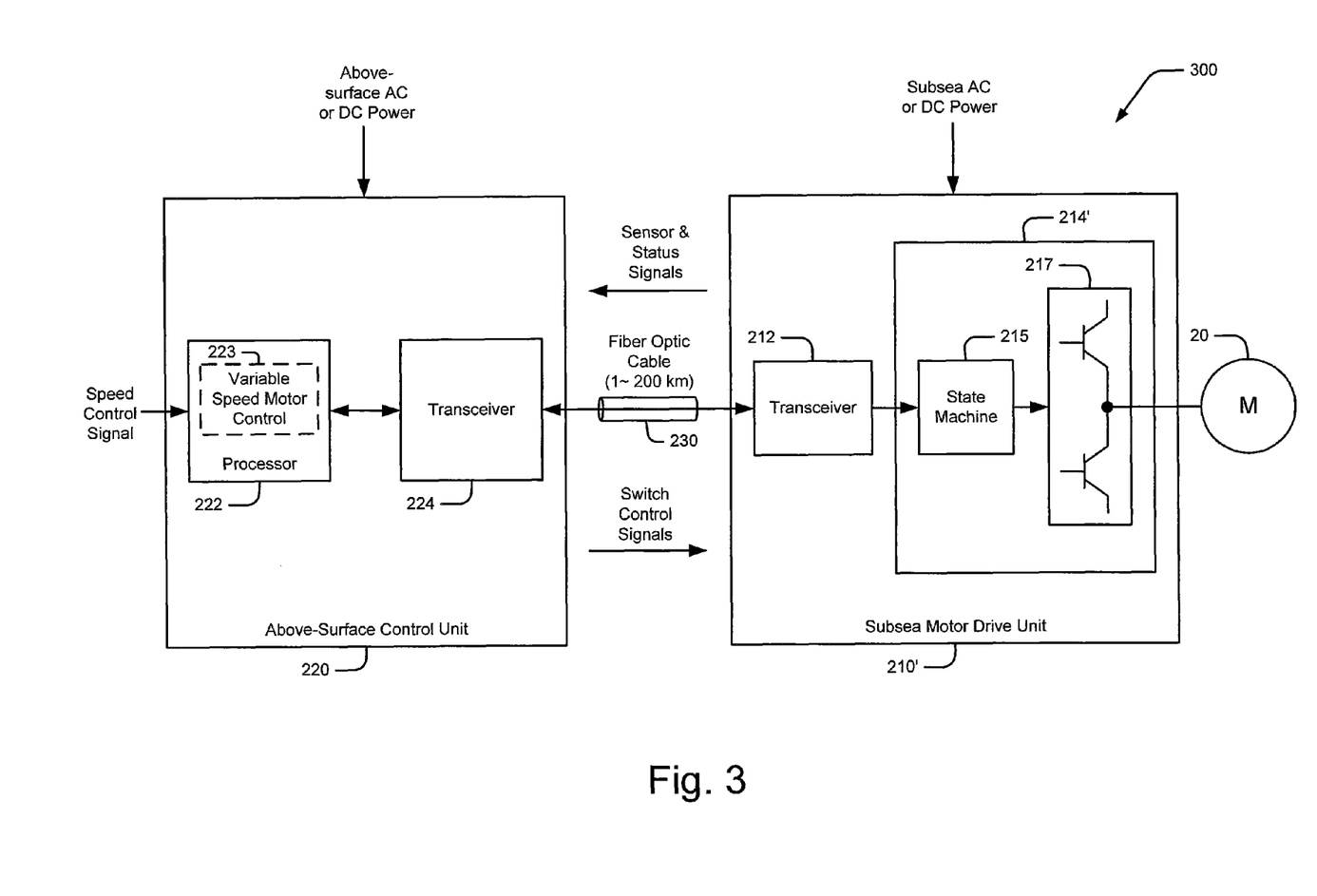
FIG. 3 is a schematic diagram illustrating a variable speed motor drive system with switch signal processing according to some embodiments of the inventive subject matter.

It will be appreciated that a subsea motor drive unit, such as the subsea motor drive unit 210, may include circuitry in addition to the communications and semiconductor switching circuitry described above. For example, a subsea motor drive unit 210' illustrated in FIG. 3 may include a semiconductor switching circuit 214 including semiconductor switches 217, along with control circuitry (e.g., logic circuitry) that, for example, reduces the likelihood of undesired states of operation by prohibiting certain switch states and/or by performing error correction or other processing operations on received switch control signals. For example, the semiconductor switching circuit 214' may include a state machine 215 that is configured to receive switch control signals recovered by a transceiver circuit 212, but is constrained to apply only certain signals to the semiconductor switches 217. For example, in embodiments using half-bridge circuits including two or more transistors coupled between DC busses, the state machine 215 may prevent or limit switch states in which all of the transistors are "on" and thus provide a sustained low impedance connection between the busses. The state machine 215 may also be used to implement "make-before-break", "break-before-make" and other switching regimes.

Figure 4:
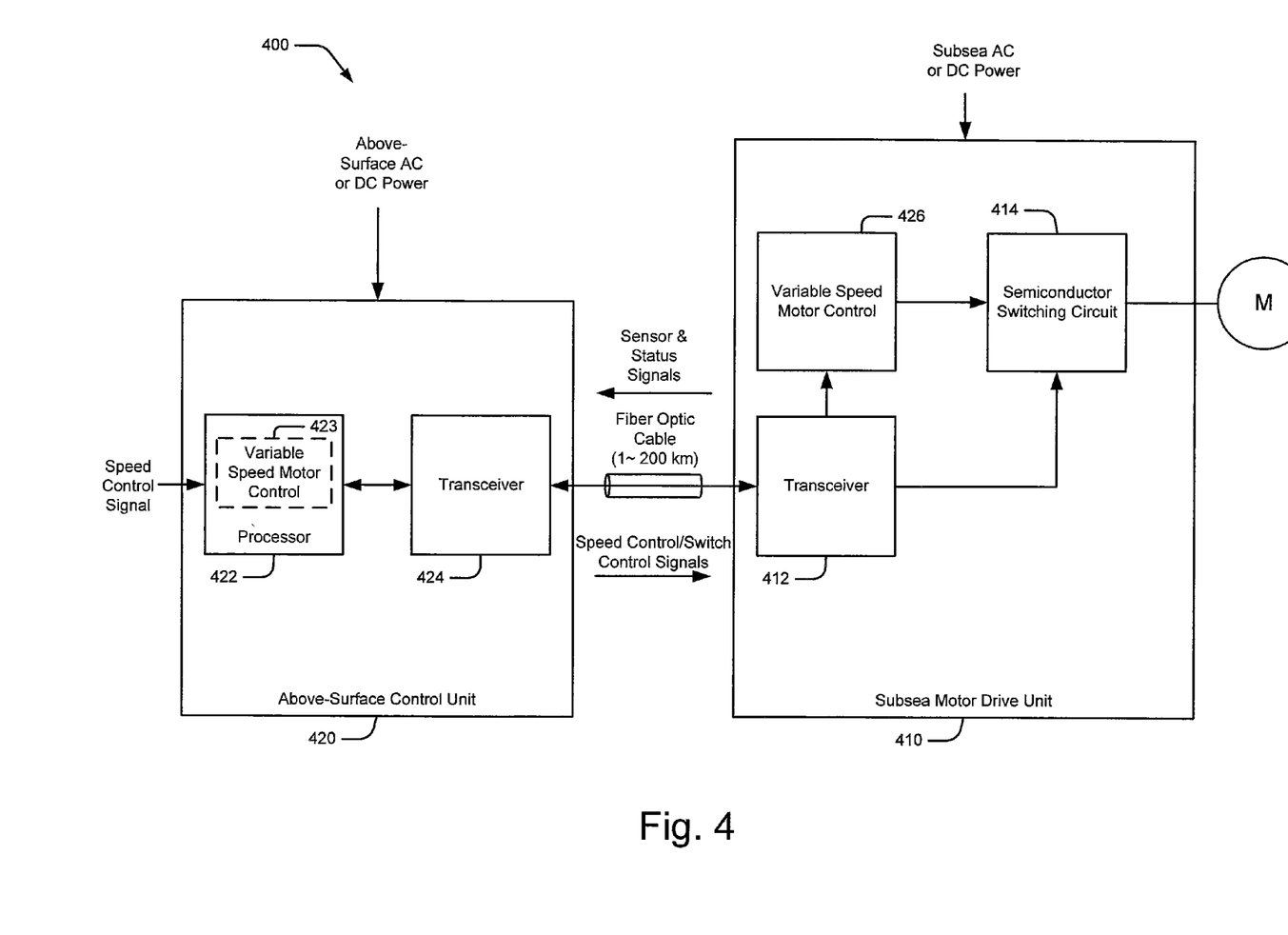
FIG. 4 is a schematic diagram illustrating a variable speed motor drive system with redundant variable speed controllers according to some embodiments of the inventive subject matter.

According to further aspects of the inventive subject matter, an above-surface control unit, such as the units 120, 220 described above, may be used as a redundant or back up controller for a subsea motor drive unit that is controlled by a primary subsea controller. FIG. 4 illustrates a variable speed motor drive system 400 according to further embodiments of the inventive subject matter. The system 400 includes a subsea unit 410 that includes a semiconductor switching circuit 414, which is configured to be coupled to a motor 20. The semiconductor switching circuit 414 includes one or more semiconductor switches (e.g., transistors, SCRs, GTOs, or the like), along with front end circuitry for driving such devices), which are controlled by switch control signals received from a variable speed control circuit 416. In a first mode of operation, the variable speed control circuit 416 may generate the switch control signals internally, e.g., the speed control and bypass circuit 416 may include a microcontroller or similar circuitry and may implement a speed control loop that is used to the control the semiconductor switching circuit 414 using, for example, feedback from the motor 20.

In this first mode, supervisory control inputs for the variable speed control circuit 416 may be received from an optical transceiver circuit 412, which communicates with an optical transceiver circuit 424 of an above-surface unit 420 via a fiber optic cable 430. The above-surface control unit 440 further includes a processor circuit 422 (e.g., a microcontroller or other processing device along with associated memory and peripheral circuitry) coupled to the transceiver circuit 424 and configured to provide a variable speed motor controller 413 using software executing thereon.

In a second mode of operation, for example, when there is a failure of the subsea variable speed control circuit 416, switch control signals may be conveyed from the above-surface control unit 420 to the semiconductor switching circuit 444 while the variable speed control circuit 416 is disabled. In particular, the variable speed controller 423 of the above-surface unit 420 may take over speed control from the subsea control circuit 416 in a manner along the lines discussed above with reference to FIGS. 1-3, sending switch control signals to the semiconductor switching circuit 414 via the optical transceiver circuit 412 and bypassing the subsea control circuit 416.

The first mode of operation may be a default mode, as propagation delays between the variable speed control circuit 416 and the semiconductor switching circuit 414 may be kept relatively small and, therefore, may allow for greater loop bandwidth and tighter speed control. The second mode may be emergency or backup mode that provides less performance but supports continued operation until the subsea control circuit 416 is repaired or replaced. The second mode may also be used, for example, to perform various diagnostic or test operations that may not be supported by the subsea control circuit 416. As further shown, the subsea unit 410 may communicate sensor, status and other signals back to the above-surface unit 420 via the fiber optic cable 430.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
an above-surface control unit comprising:
a variable speed motor control circuit configured to generate at least one switch control signal; and
a first communications circuit configured to transmit the at least one switch control signal over a communications medium; and a sub-surface motor drive unit comprising:
a driver circuit configured to be coupled to and drive an electric motor and comprising at least one semiconductor switch; and
a second communications circuit coupled to the first communications circuit via the communications medium and configured to recover the transmitted at least one switch control signal and to apply the recovered at least one switch control signal to the driver circuit and thereby cause the driver circuit to drive the electric motor.

2. The system of claim 1, wherein the first and second communications circuits are serial communications circuits.

3. The system of claim 2, wherein the first communications circuit is configured to multiplex a plurality of switch control signals and wherein the second communications circuit is configured to demultiplex the multiplexed plurality of switch control signals.

4. The system of claim 3, wherein the motor control circuit is configured to operate the driver circuit as an inverter.

5. The system of claim 1, wherein the second communications circuit is configured to transmit at least one sensor signal over the communications medium, wherein the first communications circuit is configured to receive the transmitted at least one sensor signal and wherein the variable speed motor control circuit is configured to generate the at least one switch control signal responsive to the received at least one sensor signal.

6. The system of claim 1, wherein the sub-surface motor drive unit and the above-surface control unit are configured to receive electric power from separate power sources.

7. The system of claim 1, wherein the communications medium comprises a fiber optic cable.

8. The system of claim 7, wherein the fiber optic cable has a length greater than about 1 kilometer.

9. The system of claim 1, wherein the variable speed motor control circuit comprises a first variable speed motor control circuit and wherein the system further comprises a sub-surface second variable speed motor control circuit configured to provide at least one switch control signal to the driver circuit.

10. An apparatus comprising:
a submersible driver circuit configured to be coupled to and drive an electric motor and comprising at least one semiconductor switch; and
a submersible communications circuit coupled to the submersible driver circuit and configured to be coupled to an control unit via a communications cable, to recover at least one switch control signal transmitted over the communications cable by the control unit and to apply the recovered at least one switch control signal to the submersible driver circuit and thereby cause the driver circuit to drive the electric motor.

11. The apparatus of claim 10, wherein the communications circuit is a serial communications circuit.

12. The system of claim 10, wherein the communications circuit is configured to transmit at least one sensor signal over the communications cable.

13. The system of claim 10, wherein the driver circuit is configured to receive electric power from a subsea power distribution system.

14. The system of claim 10, wherein the communications circuit is an optical communications circuit.

15. The system of claim 10, wherein the submersible communications circuit is configured to be coupled to an above-surface control unit via the communications cable.

16. A system comprising:
a submerged electric motor; and
a variable speed motor drive comprising a submerged motor drive unit coupled to and configured to drive the electric motor and comprising an inverter circuit including at least one semiconductor switch and a control unit coupled to the submerged motor drive unit via a fiber optic communications cable, the control unit transmitting at least one switch control signal for the at least one semiconductor switch to the submerged motor drive unit via the fiber optic communications cable, wherein the submerged motor drive unit transmits at least one sensor signal to the control unit via the fiber optic communications cable, and wherein the control unit generates the at least one switch control signal responsive to the at least one sensor signal.

17. The system of claim 16, wherein the submerged motor drive unit receives power from a different power source than the control unit.

18. The system of claim 17, wherein the submerged motor drive unit receives electric power from a subsea power system.

19. The system of claim 16, wherein the system further comprises a submerged variable speed motor control unit that controls the submerged motor drive unit.

20. An apparatus comprising:
a driver circuit configured to be coupled to an electric motor and comprising at least one semiconductor switch; and
a communications circuit coupled to the driver circuit and configured to be coupled to a control unit via a serial communications cable, the communications circuit further configured to recover at least one switch control signal for the at least one semiconductor switch transmitted by the control unit and responsively cause the driver circuit to drive the electric motor, wherein the driver circuit and the communications circuit are configured for sub-surface installation.

21. The apparatus of claim 20, wherein the serial communications cable comprises a fiber optic cable and wherein the communications circuit comprises an optical communications circuit.

22. The apparatus of claim 20, wherein the communications circuit is configured to transmit at least one sensor signal over the serial communications cable.

23. The apparatus of claim 20, wherein the driver circuit is configured to receive electric power from a sub-surface power distribution system.

24. A variable speed motor drive comprising:
a motor drive unit configured to be coupled to and drive an electric motor and comprising an inverter circuit including at least one semiconductor switch; and
a control unit configured to be coupled to the motor drive unit via a serial communications cable, the control unit configured to transmit at least one switch control signal for the at least one semiconductor switch to the motor drive unit via the serial communications cable, wherein the motor drive unit is configured to transmit at least one sensor signal to the control unit via the serial communications cable, and wherein control unit is configured to generate the at least one switch control signal responsive to the at least one sensor signal.

25. The motor drive of claim 24, wherein the serial communications cable comprises a fiber optic communications cable.

26. The motor drive of claim 24, wherein the motor drive unit is configured to receive power from a different power source than the control unit.

* * * * *

UNITED STATES PATENT AND TRADEMARK OFFICE
CERTIFICATE OF CORRECTION

PATENT NO. : 10,050,575 B2  
APPLICATION NO. : 14/575032  
DATED : August 14, 2018  
INVENTOR(S) : Geraldo Nojima and Audun Magne Askeland Page 1 of 1

It is certified that error appears in the above-identified patent and that said Letters Patent is hereby corrected as shown below:

In the Claims

At Column 8, Line 23, change "system" to --apparatus--

At Column 8, Line 26, change "system" to --apparatus--

At Column 8, Line 29, change "system" to --apparatus--

At Column 8, Line 31, change "system" to --apparatus--

Signed and Sealed this
Twenty-fifth Day of September, 2018

Andrei Iancu
*Director of the United States Patent and Trademark Office*